United States Patent [19]

Avery et al.

[11] Patent Number: 5,213,396
[45] Date of Patent: May 25, 1993

[54] TOWED VEHICLE BRAKE ACTIVATION METHOD AND APPARATUS

[76] Inventors: Larry L. Avery, P.O. Box 2856, Key Largo, Fla. 33037; Dennis D. Avery, 3328 Del Paso Blvd., Sacramento, Calif. 95815

[21] Appl. No.: 623,019

[22] Filed: Dec. 6, 1990

[51] Int. Cl.⁵ .................................................. B60T 7/20
[52] U.S. Cl. ...................................... 303/7; 188/112 R
[58] Field of Search ........................ 188/112 R; 303/7

[56] References Cited

U.S. PATENT DOCUMENTS

| | | | |
|---|---|---|---|
| 2,956,648 | 10/1960 | McDaniel, Sr. | 188/112 R |
| 3,448,834 | 6/1969 | Lammers | 188/112 R |
| 3,630,321 | 12/1971 | Hollnagel | 188/112 R |
| 3,768,606 | 10/1973 | Mizen et al. | 188/112 R |
| 4,239,252 | 12/1980 | Huetsch et al. | 188/112 R |
| 4,889,212 | 12/1989 | Temple | 188/112 R |
| 5,013,059 | 5/1991 | Goettker | 188/112 R |

*Primary Examiner*—Matthew C. Graham
*Attorney, Agent, or Firm*—Bernhard Kreten

[57] ABSTRACT

A towed motor vehicle brake integrated between a towing and a towed vehicle, capable of applying the brakes of the towed vehicle. The structure of a towing hitch linkage deflects somewhat when it experiences tension or compression. A sensing device, preferably consisting of a hydraulic cylinder and an attached activating rod, grounded to a rotating lever connecting to the towed vehicle, senses compression of the deflecting portion of the linkage and activates the brakes of the towed vehicle to reduce the compressive forces. The tow brake requires no modification of the towed vehicle except allowing an interface with the towed vehicle's braking system. This provides flexibility of use with a variety of towed vehicles and ease of attachment and detachment.

20 Claims, 1 Drawing Sheet

TOWED VEHICLE BRAKE ACTIVATION METHOD AND APPARATUS

FIELD OF THE INVENTION

This invention pertains to braking systems utilized by motor vehicles when towing other vehicles, and more particularly to tow bars and hitches with included control systems capable of activating the braking system of a towed vehicle.

BACKGROUND OF THE INVENTION

Towing a motor vehicle on a roadway creates many problems. Among these is both the stress placed on the towing vehicle's braking system due to the added load and the reduced control of the towing vehicle from the forces the towed vehicle applies on the towing vehicle. The prior art contains methods to control the braking systems of towed vehicles to improve safety and reduce strain. However, this invention furthers the prior art by activating brakes on the towed vehicle in a new and useful way.

The following patents reflect the state of the art of which applicant is aware. These references are included to fulfill the applicant's duty to disclose known, relevant prior art.

TABLE

| INVENTOR | U.S. PAT NO. | ISSUE DATE |
|---|---|---|
| Fenstermacher | 2,513,854 | July 4, 1950 |
| Brown | 2,522,855 | September 19, 1950 |
| Williams | 2,562,008 | July 24, 1951 |
| Mettetal | 2,575,183 | November 13, 1951 |
| Barnes | 2,633,942 | April 7, 1953 |
| Klein | 2,790,521 | April 30, 1957 |
| Hartke | 2,796,956 | June 25, 1957 |
| McCurry et al. | 4,398,771 | August 16, 1983 |
| Brochure-Atwood/Motor Rim and Wheel Service | | Service Bulletin 6/ effective 12/1/79 |

It is stipulated, however, that none of these references teach singly, nor render obvious when combined, the nexus of this invention as disclosed in greater detail hereinafter and as particularly claimed.

The McCurry device is of interest in that it provides a means for applying the braking system of a towed vehicle whenever the braking system of the towing vehicle is applied. Applicant's device is distinguishable from McCurry because the applicant's device operates independent of the braking system of the towing vehicle. This advancement of the prior art is useful because situations occur in towing a vehicle where the towed vehicle applies forces on the towing vehicle without the towing vehicle's brakes being applied. Applicant's device is able to apply the brakes of the towed vehicle in these situations, alleviating these forces without taxing the towing vehicle's brakes.

The patent to Fenstermacher teaches a hydraulic cylinder activated by the pivoting of a trailer hitch. The applicant's device incorporates some of the separate components of Fenstermacher entirely within the hitch affixed to the towing vehicle. This unique characteristic allows the towing vehicle with the attached braking device to attach to a variety of towed vehicles without substantial modification of the towed vehicles. Furthermore, the applicant's device is designed to mate with commonly utilized hitch receivers, allowing the device to be easily installed and detached. The remainder of the cited prior art diverge more starkly from the device of this application.

SUMMARY OF THE INVENTION

This invention is designed to apply the brakes of a towed vehicle whenever conditions occur creating a sufficient amount of momentum transfer from the towed vehicle forward to the towing vehicle. This invention senses the velocity differential between the two vehicles, and when it exceeds a threshold amount the braking system of the towed vehicle is applied, reducing the velocity differential.

Specifically, the velocity differential is measured by measuring the rotation of a connector between the two vehicles. This invention employs a unique structure that pivots whenever a velocity differential exists. This invention employs a sensing device incorporated into the structure that measures the amount of rotation, and hence the amount of the velocity differential. The sensing device then activates the braking system of the towed vehicle. The sensing device operates, in the preferred embodiment, by having a hydraulic cylinder fixed to the braking system which is affixed to the towing vehicle. A rod and attached piston respond to the connector attached to the towed vehicle. The piston reaches into the hydraulic cylinder and displaces fluid within the cylinder whenever the connector rotates causing the rod and piston to translate. The connector is a pivoting lever attached to the braking system by a pivot pin and attached to the towed vehicle through a tow ball which mates with a tow bar affixed to the towed vehicle. The hydraulic cylinder has an output line that interfaces with the braking system of the towed vehicle so that the braking system is activated whenever rotation of the connecting lever occurs.

Further components of this invention provide for disabling of the sensing device, structural connection of the two vehicles, and limitation of rotation of the connector lever beyond allowable limits.

OBJECTS OF THE INVENTION

The primary object of this invention is to provide a means for towing a vehicle that utilizes the braking system of the towed vehicle to eliminate forces the towed vehicle applies to the towing vehicle. The forces to be eliminated are primarily those resulting when the towing vehicle is decelerating, caused by a transfer of momentum from the towed vehicle to the towing vehicle. In general, this invention senses differences in velocity between the towed vehicle and the towing vehicle and applies the brakes of the towed vehicle when appropriate, thus conforming the vehicle's velocities to each other.

Another object of this invention is to reduce the forces created on a long highway downgrade due to the towed vehicle accelerating faster than the towing vehicle. This invention can apply the brakes of the towed vehicle without application of the brakes of the towing vehicle, thus dealing with the problems created by long downgrades without stressing the towing vehicle's brakes.

Another object of this invention is to provide for easy linkage of the two vehicles by requiring that only the towed vehicle's braking system be interfaced by the invention, and by employing simple connecting devices.

Another object of this invention is to incorporate this invention primarily within a hitch affixed to the towing vehicle. When the invention is incorporated into the hitch of the towing vehicle the invention can be used on the towing vehicle to tow any vehicle having a braking system with little modification of the towed vehicle.

Viewed from a first vantage point it is an object of the present invention to provide a braking system interposed between a towing vehicle and towed vehicle having a box shaped receiver means on the towed vehicle, braking means removably connected to the receiver means, and a trailer tongue interfacing means connecting said braking means to the trailer attached to the towed vehicle.

Viewed from a second vantage point it is an object of the present invention to provide a tow brake system for activating the brakes of a vehicle in tow comprising in combination a tow ball having a supporting lever extending therefrom having a distal extremity pivoted to a housing of a braking means fixed to a towing vehicle, whereby the tow ball and attached lever freely move in an arc, the supporting lever employing coupling means to connect to a master cylinder which interfaces with the braking system of the vehicle in tow.

Viewed from a third vantage point it is an object of the present invention to provide a hitch attached to a prime mover and connectable to a tow bar attached to a towed vehicle having a hydraulic brake system and which interfaces with the brake system of the towed vehicle activating the brake system of the towed vehicle when the velocity of the towed vehicle exceeds that of the prime mover, comprising in combination a prime mover attachment means, a tow bar connecting means, a velocity differential sensing means, and a towed vehicle brake activating means.

Viewed from a fourth vantage point it is an object of the present invention to provide a readily installable and detachable braking system interposed between a towing vehicle and a towed vehicle capable of breaking the velocity of the towed vehicle comprising in combination a receiver means on the towed vehicle, said braking system conforming to said receiver means, a towed vehicle connecting means, and a readily attachable and detachable braking system utilization means; whereby the braking system may easily be removed when not in use to avoid vandalism or theft and easily reattached when needed.

Viewed from a fifth vantage point it is an object of the present invention to provide a method for applying brakes on a vehicle in tow behind a prime mover steps including attaching a velocity differential sensing device to a receiver on the prime mover, providing the sensing device with a connector, attaching a tow bar, attached to the vehicle in tow, to the connector, and interfacing with an existing brake system on the vehicle in tow with a hydraulic line serving as output from the velocity differential sensing device.

BRIEF DESCRIPTION OF THE DRAWING FIGURES

The FIGURE is a plan view of the device of this application with cut-aways revealing inner details.

DESCRIPTION OF THE PREFERRED EMBODIMENT

Figure 1:
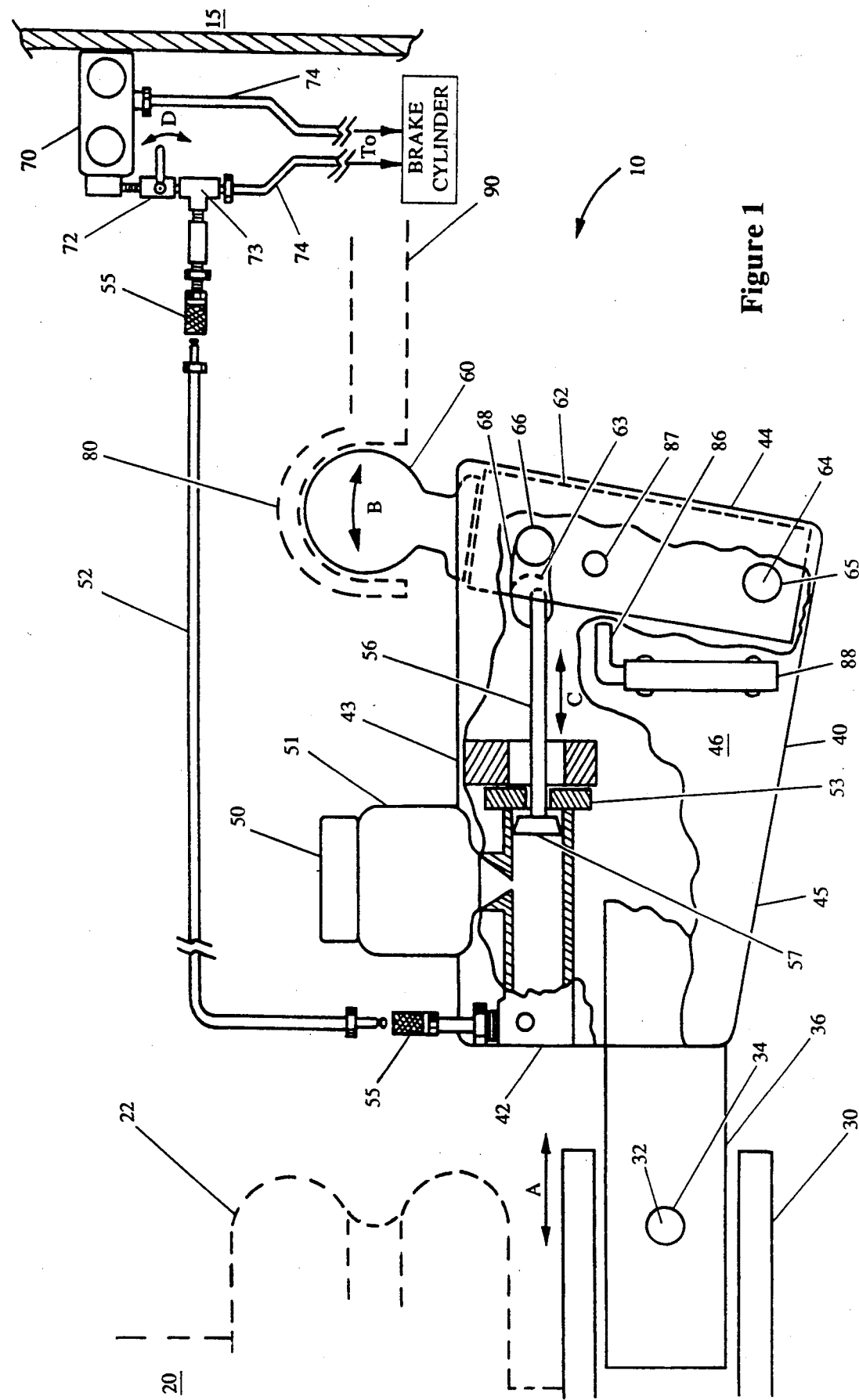

Referring now to the drawing FIGURE wherein like numerals represent like references throughout, numeral 10 represents a tow brake capable of activating an existing braking system 70 of a towed vehicle 15.

In essence, the tow brake 10 is primarily contained within a housing 40. A tongue 36 is fixedly attached to the housing 40 and extends forwardly horizontally toward a towing vehicle 20. The tongue 36 attaches to the towing vehicle 20 by mating within a receiver which is fixedly attached to the towing vehicle 20.

On a rearward portion of the interior of the housing 40 is a lever 62 attached to the housing 40 by a pivot pin 64. A tow ball 60 is fastened to an end of the lever 62 opposite from a pivot hole 65. The tow ball 60 is connectable to a socket 80 of a tow bar 90, attached to the towed vehicle 15. Within the housing 40, an activating rod 56 rests against the lever 62 on one end and is fastened to a piston 57 on an opposite end. The piston 57 resides within a hydraulic master cylinder 50 within the housing 40. A hydraulic line 52 extends from the master cylinder 50 to the towed vehicle 15, where it interfaces with a brake system 70 of the towed vehicle 15.

More particularly, the receiver 30 is a hollow tetragonal construct with walls of uniform thickness. The receiver 30 is attachable, in a preferred embodiment, to the frame of the towing vehicle 20 below its rear bumper 22. The receiver 30 is preferably oriented horizontally and parallel to the direction of travel of the towing vehicle 20. A rearward side of the receiver 30 is open providing access to the square cross-sectioned interior of the receiver 30.

The tongue 36 is a tetragonal construct having a cross-section substantially identical to the cross-section of the interior of the receiver 30. The tongue 36 may thus easily slide into and out of the interior of the receiver 30 by motion along arrow "A". A constant diameter bore hole 34 is placed through walls of the receiver 30 and the tongue 36. A receiver locking pin 32 is sized to fit within the receiver locking hole 34 securing the tongue 36 from movement relative to the receiver 30 once in place for operation. The tongue 36 enters the housing 40 on a forward wall 42 thereof. The housing 40 is fixedly attached to the tongue 36.

The housing 40 is preferably a rigid partially enclosed six sided box having the forward wall 42, a bottom wall 45, a rearward wall 44, a top wall 43, and two opposite side walls 46.

The lever 62 resides along the rearward wall 44 of the housing 40. The lever 62 is a rigid elongate construct similar in length to the height of the housing 40. The lever 62 has a spherical tow ball 60 fixedly attached to its upper end and extending out of the top of the housing 40 through an opening in the top wall 43.

In a lower rearward corner of the side wall 46 is formed a pivot hole 65. The pivot hole 65 also penetrates a lower end of the lever 62. A pivot pin 64 passes through the pivot hole 65 and entirely through the lever 62 and both side walls 46. Thus, the lever 62 is free to rotate about the pivot pin 64 along a path represented by arrow "B".

A tow bar 90 has a socket 80 which fits over the tow ball 60. The tow bar 90 is attachable to a towed vehicle 15. Thus a mechanical connection between the towing vehicle 20 and the towed vehicle 15 is defined by the receiver 30, the tongue 36, the housing 40, the lever 62, the tow ball 60, the socket 80 and the tow bar 90.

Two similar restraining slots 68 are formed opposite each other on the side walls 46. Each slot 68 is a curved oval having a center line that is a constant distance from the center of the pivot pin 64. The width of the slot 68 is equal to the diameter of a circular restraining pin 66. The pin 66 is fixedly attached to the lever 62 and extends horizontally through each slot 68 on side walls 46 of the housing 40. The restraining pin 66 defines limits beyond which the lever 62 may not rotate.

A circular lock-out hole 87 is formed horizontally through the lever 62 and the side walls 46 of the housing 40. A circular lock-out pin 86 is sized to fit within the lock-out hole 87. When the pin 86 is placed within the hole 87 all rotation of the lever 62 about the pivot pin 64 along arrow "B" is restrained. When the pin 86 is not in use it can be stored in a lock-out pin storage sleeve 88 placed on one side wall 46 of the housing 40.

On a forward portion of the lever 62 is formed a notch 63. The notch 63 is a concave recess. An activating rod 56 which is a rigid elongate construct, resides on a rearward end within the notch 63. The notch 63 is larger in cross-section than the cross-section of the activating rod 56, allowing the rod 56 to rest freely within the notch 63. A forward end of the rod 56 passes through a seal 53 and into a hydraulic master cylinder 50.

The activating rod 56 attaches to a piston 57 within the master cylinder 50. The piston 57 abuts with side walls of the master cylinder. A reservoir 51 filled with hydraulic fluid is attached to an upper side of the master cylinder 50, and extends out of the top wall 43 of the housing 40.

When the lever 62 moves forward, along arrow "B", the lever 62 pushes against the activating rod 56 within the notch 63. The activating rod 56 moves along arrow "C" driving the piston 57 into the master cylinder 50 increasing the hydraulic pressure within the master cylinder 50. When the lever 62 moves rearward, along arrow "B", the activating rod 56 merely rests within the notch 63. Thus, only when the velocity of the towed vehicle 15 exceeds the velocity of the towing vehicle 20 is any stimulus applied to the master cylinder 50.

On a forward end of the master cylinder 50 is attached a connector 55. A hydraulic line 52 interfaces on one first end with the connector 55 and on a second end with a connector 55 attached to the brake system 70 of the towed vehicle 15.

The brake system 70 of the towed vehicle 15 has two brake lines 74. A valve 72 is placed on one of the brake lines 74 up stream from a tee 73 which attaches to the connector 55. When the valve 72 is closed, by rotation of the handle along arrow "D", the brake line 74 receives input to the towed vehicles brakes from the master cylinder 50 through the connectors 55 and hydraulic line 52. When the valve 72 is open, the towed vehicle's brakes are only activated from within the towed vehicle 15.

In use and operation, the receiver 30 and valve and tee assembly 72, 73 are preferably semi-permanently attached to the towing vehicle 20 and towed vehicle 15 respectively. Operation of the two vehicles separately is not hampered by attachment of these accessories. When an operator desires to tow the towed vehicle 15 with the towing vehicle 20 he can do so quickly and easily. The tongue 36 is placed within the receiver 30 and the receiver locking pin 32 is placed through the receiver locking hole 34. The tow bar 90 and attached socket 80 are ten attached to the towed vehicle 15. The socket 80 is aligned to connect to the tow ball 60. Finally, the hydraulic line 52 is interposd between the two connectors 55. The tow brake 10 is now configured for ordinary use. If the operator desires to disable the tow brake 10, such as for travel in reverse, the lock-out pin 86 can be placed within the lock-out hole 87.

While the tow brake 10 is in operation, every time the velocity of the towed vehicle 15 exceeds the velocity of the towing vehicle 20 the tow brake 10 is activated causing the brakes on the towed vehicle 15 to be applied and eliminating the velocity differential. Removal of the tow brake 10 is easily done by reversal of the steps enunciated in the previous paragraph.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A braking system interposed between a towing vehicle and a towed vehicle, the towed vehicle being removably attached to the towing vehicle through a tow bar, said system comprising in combination:
   a box-shaped receiver means on the towing vehicle,
   braking means removably connected to the receiver means, and
   a tow bar interfacing means connecting said braking means to the tow bar attached to the towed vehicle;
   wherein said box-shaped receiver means is a hollow rectangular construct having a substantially square cross-section and sized to mate with commonly existing hitches, said rectangular construct precluding rotation of said receiver with respect to the towing vehicle and fixedly attached to a rearward portion of the towing vehicle, and wherein said braking means is removably connected to said receiver means such that when connected said braking means is affixed to said receiver means without rotation relative to said receiver means and the towing vehicle.

2. The braking system of claim 1 wherein said braking means connects to said box-shaped receiver means through a tongue of complemental size to an interior of said receiver means allowing said tongue to slide within said receiver means and said tongue being attachable to said receiver means with an attachment pin passing through side walls of both said receiver means and said tongue, said attachment pin rigidly connecting said braking means to said receiver means.

3. The braking system of claim 2 wherein said braking means is enclosed within a housing fixedly attached to said tongue.

4. The braking system of claim 3 wherein said housing contains a hydraulic master cylinder capable of receiving an input signal and sending an output signal hydraulically, whereby said braking means is activated when the towed vehicle exerts a sufficient force against the towing vehicle.

5. The braking system of claim 4 wherein said input signal is created by a lever pivoted at a first end on a pin fixedly attached to said housing and free on an opposite second end to measure differences between the velocity of the towing vehicle and the velocity of the towed vehicle, said lever interfacing with an actuating rod capable of driving a piston within said hydraulic master cylinder.

6. The braking device of claim 5 wherein said output signal is carried by a hydraulic line interposed between said master cylinder and a brake cylinder on the towed vehicle, whereby a signal transferred through said hydraulic line can activate an existing hydraulic brake system on a towed vehicle.

7. The braking system of claim 6 wherein said lever is restrained from motion relative to said housing by a lock-out pin which passes through lock-out holes in said housing and said lever, whereby said input signal is silenced for deactivation of said braking system.

8. The braking system of claim 7 wherein said tow bar interfacing means is a spherical tow ball sized to conform to commonly available trailer hitches and vehicle tow bars.

9. A tow brake system for activating a braking means of a vehicle in tow, comprising in combination:
   a tow ball having a supporting lever extending therefrom having a distal extremity pivoted to a housing of a braking means activator fixed to a towing vehicle, means to allow said tow ball and attached lever to move freely move in an arc,
   said supporting lever employing coupling means to connect to a master cylinder of said braking means activator which interfaces with the braking means of the vehicle in tow through an interface, and
   means on said housing for removably attaching and rigidly retaining said housing upon the towing vehicle, such that said housing of said braking means activator is restricted from rotation with respect to the towing vehicle.

10. The tow brake system of claim 9 wherein free movement of said lever is restricted by an arcuate slot formed in said housing of width similar to a restricting arm extending off of said lever, whereby the degree of rotation of said lever and said tow ball are defined.

11. The tow brake system of claim 10 wherein said coupling means is an actuating rod and piston freely placed on one end within a notch on said lever and located on a second end within said master cylinder wherein said piston resides.

12. The tow brake system of claim 11 wherein said interface between the master cylinder and said braking system of the vehicle in tow is a hydraulic line interposed between said master cylinder and a brake cylinder of the vehicle in tow.

13. The tow brake system of claim 12 wherein a lockout pin is provided capable of fitting within lock-out holes formed in said housing and said lever whereby relative movement between said lever and said housing is restricted allowing said tow brake system to be deactivated.

14. A readily installable and detachable braking system interposed between a towing vehicle and a towed vehicle capable of braking the velocity of the towed vehicle, comprising in combination:
   a receiver means on the towing vehicle,
   said braking system including means to be removably coupled rigidly to said receiver means,
   a towed vehicle connecting means connected to the towed vehicle, and
   a readily attachable and detachable braking system utilization means interposed and attached between said connecting means and said braking system, such that when said braking system utilization means is detached said braking system remains connected to the towing vehicle and the connection means remains connected to the towed vehicle;
   whereby the towing vehicle, with said braking system attached, is easily removed from the towed vehicle when not in use to avoid vandalism or theft and easily reattached when needed.

15. The braking system of claim 14 wherein said receiver means is a hollow rectangular construct having a substantially square cross-section and sized to mate with said braking system, and said utilization means is a tow ball, whereby when said braking system is to be utilized, said braking system can be connected to said receiver means and said tow ball can connect to a socket of said towed vehicle connecting means.

16. The braking system of claim 15 wherein said braking system is a hydraulic master cylinder interposed between a velocity differential sensing means supplying input to said master cylinder and a towed vehicle brake activating means which responds to changes in hydraulic pressure within said master cylinder.

17. A towed vehicle braking system for activating the brakes of a towed vehicle whenever forces are exerted by the towed vehicle against a towing vehicle, comprising in combination:
   a braking system housing attached directly to the towing vehicle,
   non-pivoting means on said housing precluding rotation of said housing with respect to the towing vehicle,
   a trailer tongue connection means attachable to the towed vehicle,
   a compressible housing attachment means connecting said trailer tongue connection means to said housing,
   a compression measurement means interposed between said housing and said compressible housing attachment means,
   a towed vehicle brake actuator oriented to monitor said compression measurement means and to activate the brakes of the towed vehicle when compressive forces are monitored, and
   a compression deactivating means interposed between said housing and said compressible housing attachment means.

18. The towed vehicle braking system of claim 17 wherein said compressible housing attachment means is a lever pivotably attached to said housing and said compression deactivating means is a lock-out pin and a complementally formed hole passing through said lever and said housing, whereby location of said lock-out pin within said complementally formed hole restricts pivoting of said lever relative to said housing.

19. An interfacing device for activating an existing towed vehicle braking system whenever forces are exerted by the towed vehicle against a towing vehicle, comprising in combination:
   a housing attached directly to the towing vehicle,
   non-pivoting means on said housing precluding rotation of said housing with respect to the towing vehicle,
   a trailer tongue connection means attached to the towed vehicle,
   a compressible housing attachment means connecting said trailer tongue connection means to said housing,
   a compression measurement means interposed between said housing and said compressible housing attachment means,
   a towed vehicle brake actuator fixedly attached to said housing, and
   an existing towed vehicle braking system interfacing means interposed between said actuator and the existing towed vehicle braking system, said interfacing means having means for transmitting a signal similar to the signal generated by a user in utilizing the existing towed vehicle braking system to the braking system when compressive forces are monitored by said compression measurement means.

20. The existing towed vehicle braking system interfacing device of claim 19 wherein said towed vehicle brake actuator is a hydraulic cylinder, and said existing towed vehicle braking system interfacing means is a hydraulic line connected on a first end to said hydraulic cylinder and connected on a second end through an adjustable valve to a hydraulic brake line of the existing towed vehicle braking system, said valve replacing a hydraulic signal from the existing vehicle's master cylinder with a hydraulic signal from said hydraulic cylinder.

* * * * *